(12) United States Patent
Andrews

(10) Patent No.: US 6,523,842 B2
(45) Date of Patent: Feb. 25, 2003

(54) TORSION SUSPENSION SYSTEM

(76) Inventor: Ralph Andrews, 516 "F" St. SE., Quincy, WA (US) 98848-1498

( * ) Notice: Subject to any disclaimer, the term of this patent is extended or adjusted under 35 U.S.C. 154(b) by 0 days.

(21) Appl. No.: 09/907,070

(22) Filed: Jul. 16, 2001

(65) Prior Publication Data
US 2002/0005623 A1 Jan. 17, 2002

Related U.S. Application Data
(60) Provisional application No. 60/218,960, filed on Jul. 17, 2000.

(51) Int. Cl.$^7$ ............................ B60G 11/23; B60G 11/24
(52) U.S. Cl. .................... 280/124.106; 280/124.167; 267/273
(58) Field of Search ................. 280/124.167, 124.169, 280/124.166, 124.106; 267/273, 279; 180/352

(56) References Cited
U.S. PATENT DOCUMENTS
6,019,384 A 2/2000 Finck ................. 280/124.17

Primary Examiner—Peter C. English
(74) Attorney, Agent, or Firm—Dean A. Craine

(57) ABSTRACT

An improved torsion suspension system designed to limit excessive side sway conditions with a popular torsion suspension system. The improved system uses a torsion shackle bracket that bolts to the second flanged shell half used on the existing torsion suspension system. The system also includes an anti-sway rod that connects at one end to an axle mounted on the torsion shackle bracket. The opposite end of the anti-sway rod is connected to the motor vehicle frame or to a selectively attached bracket attached to the frame located across from the torsion shackle bracket. In the preferred embodiment, the anti-sway rod extends to an opposite side of the motor vehicle. During use, the ends of the anti-sway rod are able to rotate around the axles so that the shackle is able to move vertically and provide a softened ride. The rod is sufficiently rigid to limit the lateral movement of the second flanged shell half, thereby limiting side sway.

13 Claims, 3 Drawing Sheets

TORSION SUSPENSION SYSTEM

This application claims the benefit of U.S. Provisional Application No. 60/218,960 filed on Jul. 17, 2000.

BACKGROUND OF THE INVENTION

1. Field of the Invention

This invention pertains to a suspension system for a motor vehicle and, more particularly, to an improved torsion suspension system.

2. Description of the Related Art

Torsion suspension systems are widely used in large motor homes to soften or cushion the ride. Hundreds of thousands of motor homes have been sold with such systems as disclosed in U.S. Pat. No. 5,215,328. Such systems are sold by B. F. Goodrich, Inc. under the trademark VELVET RIDE.

In summary, the torsion suspension systems uses two torsion spring assemblies located on opposite sides of the motor home between the axle and the motor vehicle frame. Each torsion spring assembly includes an elongated shell aligned longitudinally on the motor home frame that extends across the axle on the motor vehicle. The opposite ends of each elongated shell are connected to transversely aligned suspension arms that connect at one end to the upper section of vertically aligned shackles. The lower sections of the shackles are securely attached to the transversely aligned frame members located on opposite sides of the axle. During use, the two suspension arms and two shackles hold the opposite ends of the elongated shell in place over the axle and provide resistance to the elongated shell as the motor vehicle frame members move up and down relative to the wheels.

Each suspension arm includes a first flanged shell half that connects with suitable connectors to a second flanged shell half. Disposed between the first flanged shell half and the second flanged shell half is the upper section of the shackle. Suitable bolts and nuts are used to selectively attach the first and second flanged halves together. Each shackle includes two parallel lateral support members that extend between the upper and lower sections. During use, force is exerted on the axle or frame, which causes the lateral support member to bend and stretch. Over time, the upper sections of the shackle move laterally with respect to the lower section. While the support members may still function properly to provide a comfortable ride, they become too stretched and lose their elasticity, thus creating excessive side sway. This is especially troublesome on older motor vehicles where excessive swaying can cause driving accidents.

What is needed is an improved torsion suspension system for a motor home that provides a comfortable ride that reduces side sway. What is also needed is an improved torsion suspension system that can be retrofitted on used motor homes with torsion suspension systems.

SUMMARY OF THE INVENTION

It is an object of the present invention to provide an improved torsion suspension system for motor homes that provide a comfortable ride yet reduces side sway.

It is another object of the present invention to provide such a torsion suspension system that can be used on new motor homes or retrofitted on older, used motor homes that use torsion suspension systems found in the prior art.

These and other objects of the invention which will become apparent are met by an improved torsion suspension system which stabilizes the shackles and suspension arms commonly used on torsion spring assemblies found in the prior art and now incorporated by reference herein. The improved system is designed to be an add-on feature to existing torsion spring assemblies found on many torsion suspension systems used on motor home vehicles so that original components may be used and function in the same manner.

More particularly, the improved system uses a torsion shackle bracket that bolts to the second flanged shell half on an existing torsion spring assembly. The torsion shackle bracket includes an axle that connects to an anti-sway rod that extends transversely over the motor vehicle. The opposite end of the anti-sway rod pivotally connects to the motor vehicle frame or to a frame bracket attached to the frame located on opposite sides of the motor vehicle. During use, the anti-sway rod stabilizes the torsion shackle bracket and prevents lateral movement of the upper section of the shackle thus reducing side sway. The bracket and anti-sway rod do not interfere with the torsion spring assembly ride softening ability since the ends of the rod are pivotally attached to allow the shackles to pivot to cushion the ride. In the preferred embodiment, the improved torsion suspension system is used on opposite sides of the motor vehicle.

DESCRIPTION OF THE PREFERRED EMBODIMENT(S)

Figure 1:
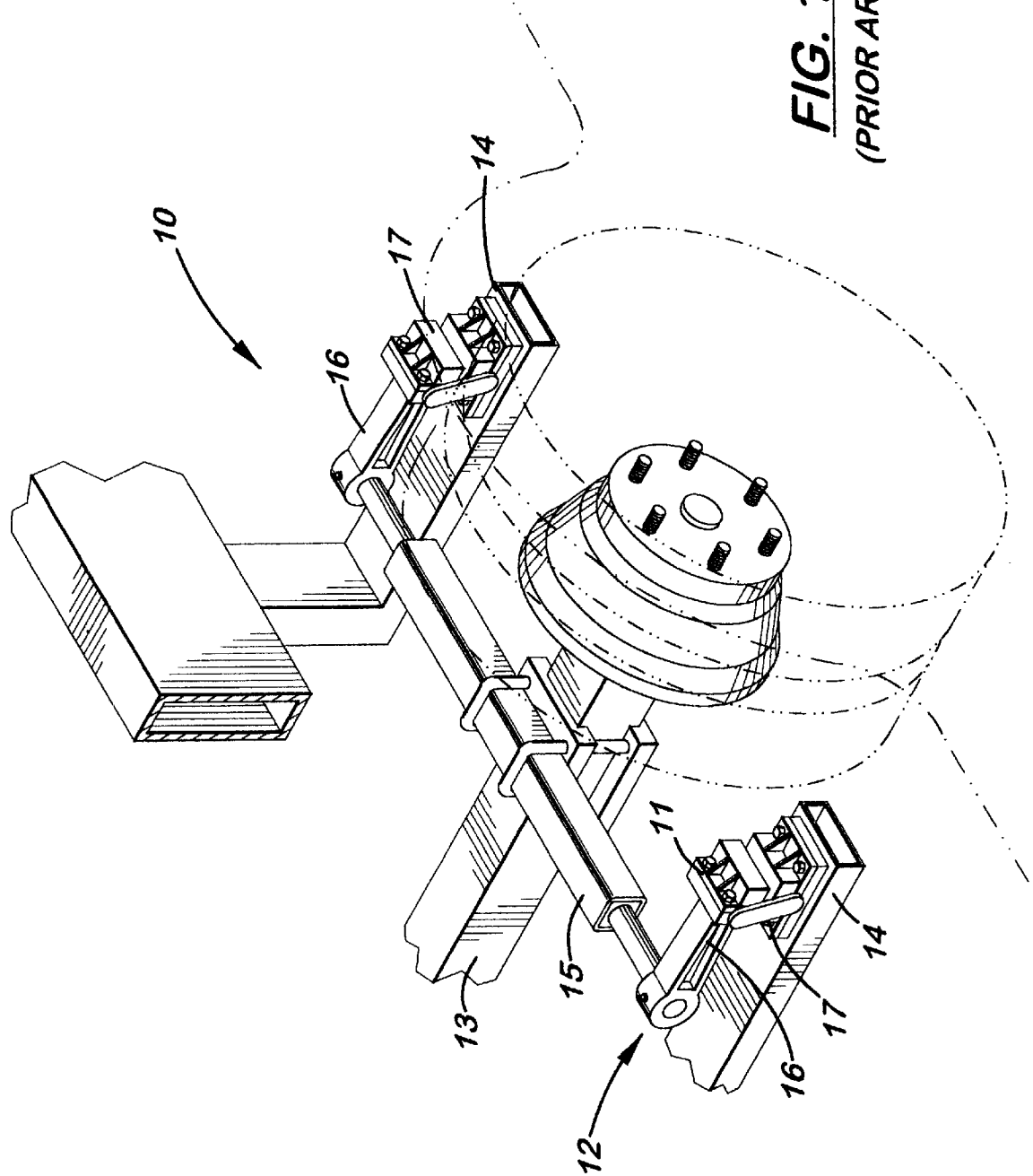
FIG. 1 is a perspective view of the torsion suspension system found in the prior art.
Figure 2:
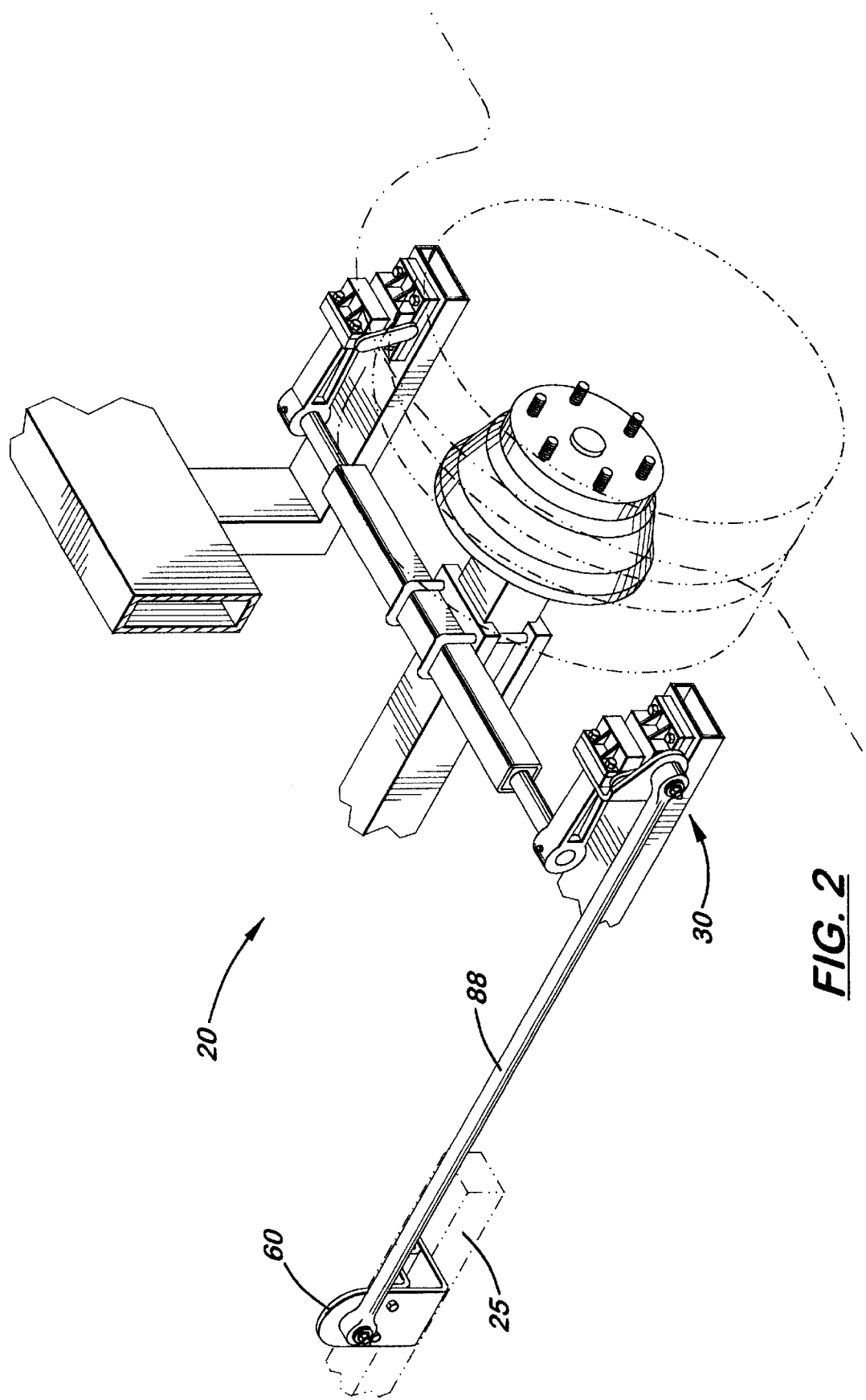
FIG. 2 is a front elevational view of the improved torsion suspension system.
Figure 3:
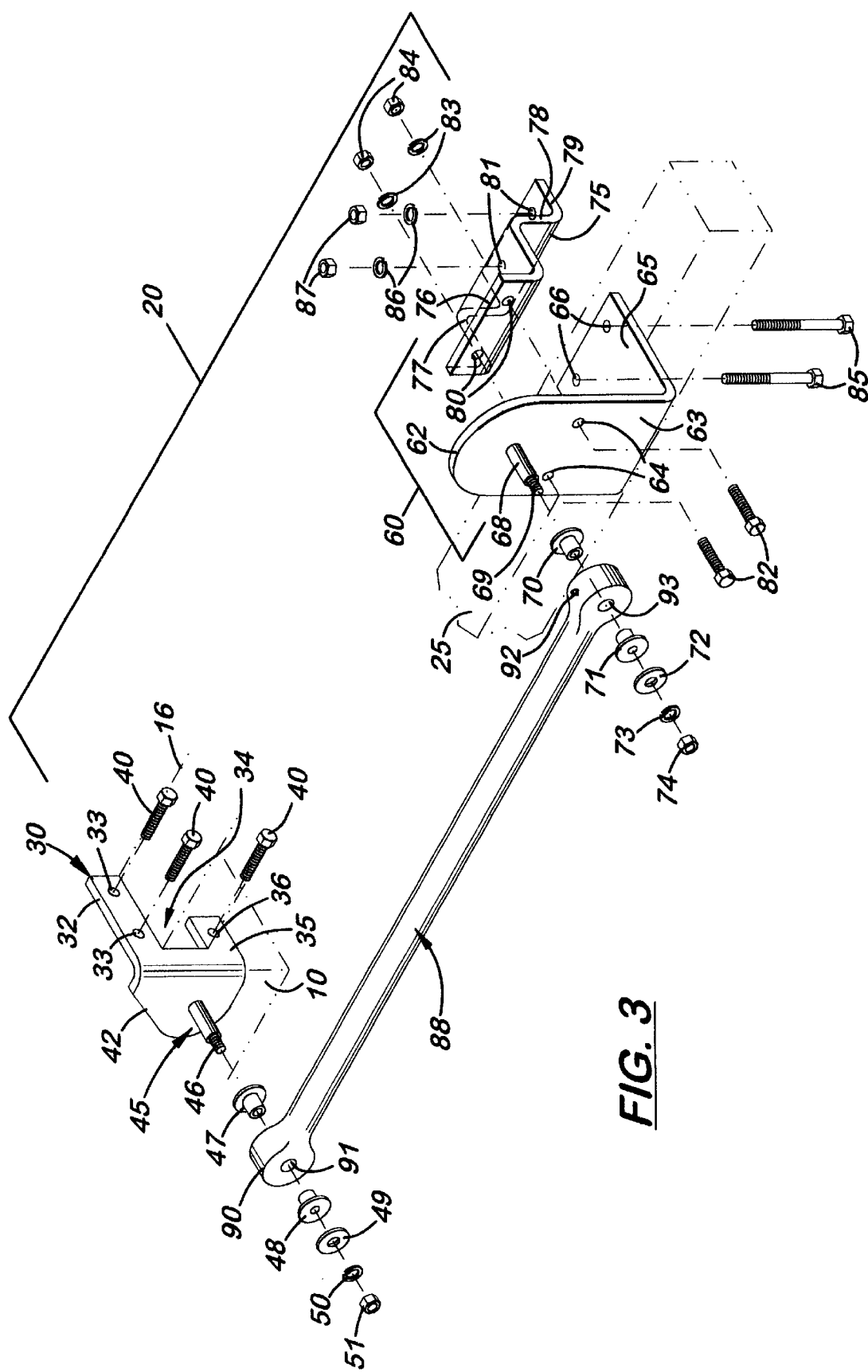
FIG. 3 is an exploded perspective view of the torsion assembly bracket, the anti-sway rod, and frame bracket.

Referring to the accompanying FIGS. 2–3, there is shown and described an improved torsion suspension system 20 used to prevent excessive side sway in a motor home. The improved suspension system 20 is designed to be an improvement of the widely used torsion suspension system 10 sold by B. F. Goodrich, Inc. under the trademark VELVET RIDE, shown in FIG. 1.

In summary, the prior art torsion suspension system 10 uses two torsion spring assemblies 12 located on opposite sides of the motor home between the motor home axle 13 and the frame 14. Each torsion spring assembly 12 includes an elongated shell 15 aligned longitudinally and extended across the axle 13 on the motor home. The opposite ends of the elongated shell 15 are connected to suspension arms 16 that connect at their opposite ends to vertically aligned, molded shackles 17. The lower section of each shackle 17 is securely attached to portions of the motor vehicle frame 14 located on opposite sides of the axle 13. During use, the suspension arms 16 and shackles 17 provide resistance to the ends of elongated shell 15 as the motor vehicle frame 14 moves up and down relative to the axle 13.

The improved system 20 includes a torsion shackle bracket 30 that bolts directly to the second flanged half shell 11 used in a torsion spring assembly 10, shown in FIG. 1. The torsion shackle bracket 30 includes an axle 45 attached to its outer surface. Pivotally connected to the axle 45 is a rigid anti-sway rod 88 that extends transversely to the opposite side of the motor vehicle and pivotally connects to a second axle 68. During use, the anti-sway rod 88 stabilizes the torsion shackle bracket 30 and prevents it and the second flanged half shell 11 from moving transversely and causing excessive side sway.

As shown in FIG. 3, the torsion shackle bracket 30 is L-shaped and includes a vertical, longitudinally aligned upper arm 32, a vertical, longitudinally aligned lower arm 35, and a vertical, transversely aligned flange member 42. Formed between the upper and lower arms 32, 35 is a passageway 34 through which the suspension arm 16 may extend. Formed on the upper arm 32 is a pair of holes 33 and formed on the lower arm 35 is a single hole 36 that match the hole pattern formed on the second flanged half shell 11. Threaded bolts 40 that are normally used to attach the second flanged half shell 11 to the shackle 17 now extend through the holes 33, 36 to connect the torsion shackle bracket 30 between the first flanged half shell and the second flanged half shell 11.

Formed on the flange member 42 is the axle 45. The distal end of the axle 45 includes external threads 46 which enable it to connect to a threaded nut 51 during assembly. Attached over the axle 45 is an inner bushing 47, an outer bushing 48, a flat washer 49, and a lock washer 50.

Attached to a frame member 25, located toward the opposite side of the motor vehicle, is a frame bracket 60. In the embodiment shown, the frame bracket 60 includes an L-shaped member 62 and a Z-shaped member 75 which are placed around the frame member 25 and connected together with bolts 82, 85, lock washers 83, 86, and nuts 84, 87, respectively. More specifically, the L-shaped member 62 includes a vertical flange member 63 and a horizontal flange member 65. Formed on the flange member 63 is a pair of holes 64 designed to receive threaded bolts 82. Formed on the flange member 65 is a pair of holes 66 designed to receive threaded bolts 85. The Z-shaped member 75 includes an upper vertical flange 76, an upper horizontal flange 77, a lower vertical flange 78, and a lower horizontal flange 79. During assembly, the L-shaped member 62 and Z-shaped member 75 are placed on opposite sides of the frame member 25 so that the upper vertical flange 76 is forced against the back surface of the vertical flange 63 on the L-shaped member 62 with the holes 64, 80 being aligned and registered. The flange member 65 is placed under the frame member 25 while the upper horizontal flange 77 is positioned over the top surface of the frame member 25 and the holes 81 are aligned and registered with the holes 66 formed on the flange member 65. When properly assembled, the flange member 65 extends under and beyond the lower surface of the frame member 25.

Formed on the outer surface of the vertical flange member 63 is an axle 68. Like axle 45, the distal section of the axle 68 has external threads 69 designed to connect to a nut 74. Attached over the axle 68 are an inner bushing 70, an outer bushing 71, a standard washer 72, and a lock washer 73.

As mentioned above, extending transversely between the torsion shackle bracket 30 and the frame bracket 60 is an elongated anti-sway rod 88. The rod 88 has opposite first and second ends 90, 92, with bores 91, 93, respectively, formed therein. During assembly, the inner bushings 47, 70 are longitudinally aligned and positioned over the axles 45, 68, respectively. The bores 91, 93 on the rod 88, are then positioned over the bushings 47, 70. The outer bushings 48, 71, flat washers 49, 72, lock washers 50, 73, and nuts 51, 74 are then aligned and positioned over the axles 45, 68, respectively, to securely attach the rod 88 to the axles 45, 68. During use, the first and second ends 90, 92 are able to rotate around the axles 45, 68 so that the shackle 17 is able to move vertically to soften the ride. The rod 88 may be straight (as shown) or slightly bent to extend around the various components and frame members located under the motor vehicle. In the preferred embodiment, the anti-sway rod 88 is made of steel and measures approximately one inch in diameter and at least thirty-six inches in length. Preferably, the rod 88 is forty-one inches in length.

It should be understood that the axle 68 may be welded directly to the motor vehicle frame so that the end 92 may be attached directly to the motor vehicle frame rather than to the frame bracket 60.

In compliance with the statute, the invention has been described herein in language more or less specific as to structural features. It should be understood, however, that the invention is not limited to the specific features shown, since the means and construction shown, comprise only some of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A torsion suspension system for a motor vehicle having a transversely aligned axle and at least one transversely aligned frame member, said motor vehicle also having at least one torsion spring assembly disposed between the axle and the frame member, said torsion spring assembly including a suspension arm with a shackle attached to one end, said suspension arm including a first flanged shell half and a second flanged shell half receiving an elastic member, said shackle having an upper section and a lower section, said upper section being disposed between said first and second flanged shell halves, said lower section of said shackle being attached to said frame member, said torsion suspension system comprising:

a. a torsion shackle bracket connected to said shackle;
    b. a rigid anti-sway rod having a first end and a second end;
    c. means to pivotally connect said first end of said rod to said torsion shackle bracket; and,
    d. means to pivotally connect said second end of said rigid rod to a frame member located transversely on said motor vehicle to limit lateral movement of said torsion shackle bracket when said motor vehicle is driven.

2. The torsion suspension system, as recited in claim 1, wherein said torsion shackle bracket is a L-shaped structure with parallel upper and lower arms and a perpendicularly aligned flange member, said upper and lower arms being connected between said first and second flanged shell halves to connect said torsion shackle bracket to said shackle.

3. The torsion suspension system as recited in claim 2, wherein said means to pivotally connect said torsion shackle bracket to said first end of said rod includes an axle attached to said flange member on said torsion shackle bracket and a bore formed in said rod through which said axle may extend.

4. The torsion suspension system as recited in claim 3, further including means to lock said first end of said rod to said axle including external threads formed on said axle and a complimentary threaded nut capable of attaching to said external threads.

5. The torsion suspension system as recited in claim 2, wherein said rod is attached to a frame bracket attached to a frame member on the motor vehicle located transversely from said torsion shackle bracket.

6. The torsion suspension system as recited in claim 5, wherein said frame bracket includes two members disposed on opposite sides of said frame member located transversely from said torsion shackle bracket and selectively interconnected around said frame member, said frame bracket including an axle that connects to said rod.

7. The torsion suspension system as recited in claim 1, wherein said rod is at least 36 inches in length.

8. A torsion suspension system for a motor vehicle having a transversely aligned axle and at least two transversely aligned frame members located on opposite sides of said axle and a third frame member located laterally to said transversely aligned frame members, said system comprising:
  a. at least one torsion spring assembly disposed longitudinally over said axle and said transversely aligned frame members, said torsion spring assembly including a suspension arm with a shackle attached to one end, said suspension arm including a first flanged shell half and a second flanged shell half receiving an elastic member, said shackle having an upper section and a lower section, said upper section being disposed between said first and second flanged shell halves, said lower section of said shackle being attached to a frame member;.
  b. a torsion shackle bracket connected to said shackle;
  c. a rigid anti-sway rod having a first end and a second end;
  d. means to pivotally connect said first end of said rod to said torsion shackle bracket; and,
  e. means to pivotally connect said second end of said rigid rod to said third frame member to limit lateral movement of said torsion shackle bracket when said motor vehicle is driven.

9. The torsion suspension system, as recited in claim 8, wherein said torsion shackle bracket is a L-shaped structure with parallel upper and lower arms and a perpendicularly aligned flange member, said upper and lower arms being connected between said first and second flanged shell halves to connect said torsion shackle bracket to said shackle.

10. The torsion suspension system as recited in claim 9, wherein said means to pivotally connect said torsion shackle bracket to said first end of said rod includes an axle attached to said flange member on said torsion shackle bracket and a bore formed in said rod through which said axle may extend.

11. The torsion suspension system as recited in claim 10, further including means to lock said first end of said rod to said axle which includes external threads formed on said axle and a complimentary threaded nut capable of attaching to said external threads.

12. The torsion suspension system as recited in claim 9, wherein said means to pivotally connect said second end of said rigid rod is a frame bracket attached to said third frame member, said frame bracket including an axle to which said second end of said rigid rod attaches.

13. The torsion suspension system as recited in claim 12, wherein said frame bracket includes two members selectively interconnected around said third frame member.

* * * * *